July 9, 1968     P. L. ALBRIGHT     3,391,752

ELECTRIC BATTERY IN COMBINATION WITH ARTICLE OF MANUFACTURE

Filed Oct. 24, 1965

INVENTOR
P. L. ALBRIGHT

United States Patent Office 3,391,752
Patented July 9, 1968

3,391,752
ELECTRIC BATTERY IN COMBINATION WITH
ARTICLE OF MANUFACTURE
Penrose Lucas Albright, 1523 Woodacre Drive,
McLean, Va. 22101
Filed Oct. 24, 1965, Ser. No. 504,969
7 Claims. (Cl. 180—65)

ABSTRACT OF THE DISCLOSURE

An electrical battery powered vehicle wherein the batteries, including the electrodes thereof, are integrated into the vehicle as structural members.

Summary and objects of the invention

This invention relates to battery powered vehicles. In particular, it relates to an electric battery which also functions as a structural member of a vehicle.

Battery power vehicles are advantageous in that they provide a smooth takeoff and run silently without significant vibration or exhaust fumes. However, major disadvantage lies in their low power-to-weight ratio. It is an object of this invention to increase this ratio by the utilization of structural members of the battery as also structural members of the vehicle. Other objects, adaptabilities and capabilities will appear as the description progresses, reference being had to the accompanying drawing, in which:

Description of the preferred embodiment

Figure 1:
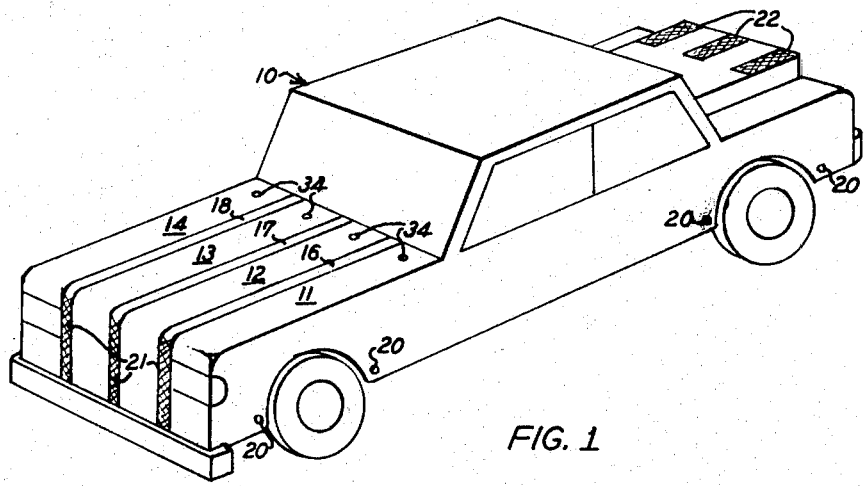
FIG. 1 is a perspective view of the vehicle in accordance with the invention.

FIG. 1 shows a vehicle 10 which is comprised of four battery segments 11, 12, 13 and 14 and intervening spacer segments 16, 17 and 18. The segments 11, 12, 13, 14 and 16, 17, 18 are held together by bolts 20 or other suitable securing means.

The spacers 16, 17, 18 are hollow and include passages whereby air can circulate through vents 21 and other similar vents 22 in the rear of the vehicle. The vents can be closed or damped for cold weather usage by suitable means as will occur to those skilled in the art. The function of the spacers is primarily ventilation for the battery segments, although in extreme cold weather they may be used for the opposite purpose, that is, for warming the battery segments by the circulation of warm air therethrough or the inclusion of heating segments.

The battery segments 11, 12, 13, 14 are preferably Edison nickel-iron type batteries, although other types may be employed. An important criteria is the ratio of the weight the battery segments can contribute to the vehicle as a whole to its power output for normal operations. This ratio should be as small as practicable.

Figure 2:
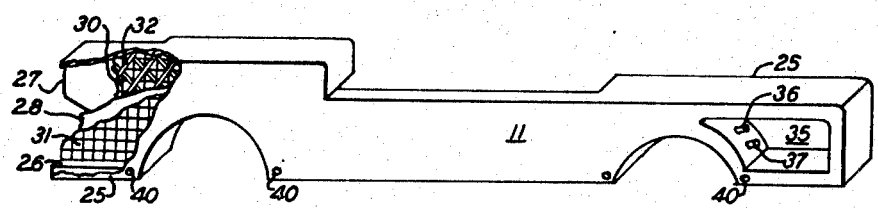
FIG. 2 is a perspective view of a battery segment of the vehicle with a portion broken away to show the interior.

From FIG. 2 it will be noted that the battery segment 11 is conformed to the shape of the vehicle 10 and functions as a structural member. The casing 25 is steel and has a non-conductive interior lining 26 composed of molded hard rubber epoxy or other suitable material. The liner 26 functions as a connector between the casing 25 on the one hand and, on the other, the negative plates 27 and the positive plates 28, whereby such plates contribute to the strength of the segment as a whole.

The negative plates 27 each comprise a nickel-plated steel frame containing perforated steel pockets filled with finely divided iron oxide 30.

The positive plates 28 each comprise a nickel plated steel frame onto which are securely mounted perforated steel tubes filled with alternate layers of nickel hydroxide and pure metallic nickel plate 31.

Secured to the lining 26 and interposed between the plates 27 and 28 are mats 32 composed of a non-conductive material such as hard rubber. An electrolyte of potassium hydroxide with additives known to the art is used in the battery segments.

Figure 3:
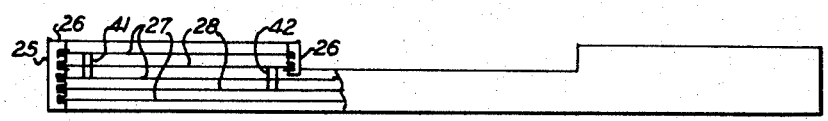
FIG. 3 is a partial sectional view in plan of the battery segment shown in FIG. 2.

Vent caps 34 are provided and each includes a gas release valve. The electric motor for propelling the vehicle, charging apparatus and the like may be located in space 35 which also has the positive and negative terminal pillars 36, 37 respectively, connected to the respective negative plates 27 and positive plates 28. Apertures 40 receive bolts 20, with an offset as shown in FIG. 3, jumpers such as those designated 41 and 42 connect like-polarity plates.

It will be appreciated that battery segment 11 presents a structural member similar to an I-beam with a plurality of vertical members comprising the plates and sides of the casing. The segment is structurally strong and functions as a structural member of the vehicle and additionally, as an enclosure member for the interior of the vehicle.

A vehicle comprised of similar battery segments of the type disclosed herein is competitive with conventional gasoline-powered automobiles in the power-to-weight ratio. The battery segments are not injured by freezing or over-charging and will operate in temperatures approaching —25° F. They can be expected to give seven to twelve years of heavy duty usage with minimum maintenance and are capable of producing vehicular speeds over 60 m.p.h. Distances over 100 miles can be accomplished on a full charge before recharging is required. Although each segment is shown as a single battery, it will be understood that the segment may be divided into multiple batteries.

While I have described the preferred embodiment of my invention, it is to be understood that it is capable of other adaptations and modifications within the scope of the appended claims.

Having thus described my invention, what I claim as new and desire to secure by Letters Patent of the United States is:

1. A battery powered vehicle comprising a battery, said battery comprising a casing and plate means connected substantially rigidly thereto to form an integrated structural member, said casing and said plates means constituting a structural strength contributing member of said vehicle.

2. A battery powered vehicle according to claim 1 comprising a plurality of batteries.

3. A battery powered vehicle in accordance with claim 1, wherein said battery is an Edison battery.

4. A battery powered vehicle in accordance with claim 1, wherein said battery includes vertically disposed negative and positive plates and said casing includes horizontal members, said plates firmly attached to said horizontal members.

5. A battery powered vehicle in accordance with claim 1, including a plurality of batteries with intervening spacer members whereby air space is provided on all sides of said batteries.

6. A battery constituting a structural member of a vehicle, said battery having a portion surrounding a space adapted to receive a motor for propelling said vehicle adapted to be driven by said battery.

7. A battery included in an article, said battery supplying electricity to said article and comprising plate means which constitute a structural strength-contributing part of said article.

References Cited

UNITED STATES PATENTS

| | | | |
|---|---|---|---|
| 310,724 | 1/1885 | Rogers | 105—50 |
| 650,014 | 5/1900 | Kitsee | 180—65 X |
| 3,066,178 | 11/1962 | Winkler | 136—25 X |
| 2,272,744 | 2/1942 | Helling | 240—10.63 |
| 2,312,463 | 3/1943 | Zdansky | 240—10.6 |
| 3,160,528 | 12/1964 | Dengler et al. | 136—181 XR |

FOREIGN PATENTS

| | | |
|---|---|---|
| 182,633 | 7/1922 | Great Britain. |

LEO FRIAGLIA, *Primary Examiner.*

MILTON L. SMITH, *Examiner.*